UNITED STATES PATENT OFFICE.

VICTOR CHARLES JOHN NIGHTINGALL, OF MELBOURNE, VICTORIA, AUSTRALIA.

RADIO-ACTIVE COMPOSITION OF MATTER.

1,017,581.     Specification of Letters Patent.     Patented Feb. 13, 1912.

No Drawing.     Application filed June 11, 1910. Serial No. 566,436.

*To all whom it may concern:*

Be it known that I, VICTOR CHARLES JOHN NIGHTINGALL, of 191 Russell street, Melbourne, in the State of Victoria, Commonwealth of Australia, electrical engineer, and a citizen of the Commonwealth of Australia, have invented new and useful Radio-Active Compositions of Matter, of which the following is a specification.

This invention has for its object the prevention of the destruction of root and other crops by bacteria or fungoid growths or eel worm disease or other troubles caused by parasites. It is well known that onions for instance, are liable to be destroyed by certain eel worms which spread over vast areas of country and destroy the onion plants within that area.

This invention consists mainly in the utilization of one of the properties of radio active materials. Certain rays from this material have the effect of destroying certain kinds of fungi, bacteria and eel worms and other parasites including those which cause the destruction of the onion crop.

The invention is also applicable for the treatment of other kinds of root crops, also wheat and various other crops that are liable to be injuriously affected by bacteria or fungi or other parasites.

According to this invention a small portion of radio-active material reduced in strength by being mixed with some inert substance, which is non radio active but having chemical properties preferably of benefit to the soil, is applied to the soil in suitable quantities.

In carrying out the invention, a low grade radio-active material, such as crude carnotite ore, at present found in South Australia, may be employed. The effect of the radio active material upon the onion or other plants is beneficial in that it effects the destruction of the injurious bacteria, or parasite, but under some circumstances it has a tendency to injure the plant during the early stages of its life, therefore, it is preferably applied in combination with phosphate or other suitable fertilizer in order that such fertilizer may stimulate the growth of the plant and thus help it through its earlier stages of existence, after which great stimulation of growth takes place, caused by the radio-active medium.

The strength of the radio-active material to be applied to the soil for the above purpose may be in the proportion of from one part in five by weight down to say one part in a hundred according to the nature of the soil and the crop to be protected.

What I do claim as my invention and desire to secure by Letters Patent is—

1. A composition comprising a radio active material combined with a phosphate fertilizer, substantially as and for the purposes specified.

2. A radio active material combined with a fertilizer, substantially as and for the purposes specified.

In witness whereof I have hereunto set my hand in the presence of two witnesses.

VICTOR CHARLES JOHN NIGHTINGALL

Witnesses:
 PERCY HEDGES,
 WILLIAM ARMSTRONG.